UNITED STATES PATENT OFFICE.

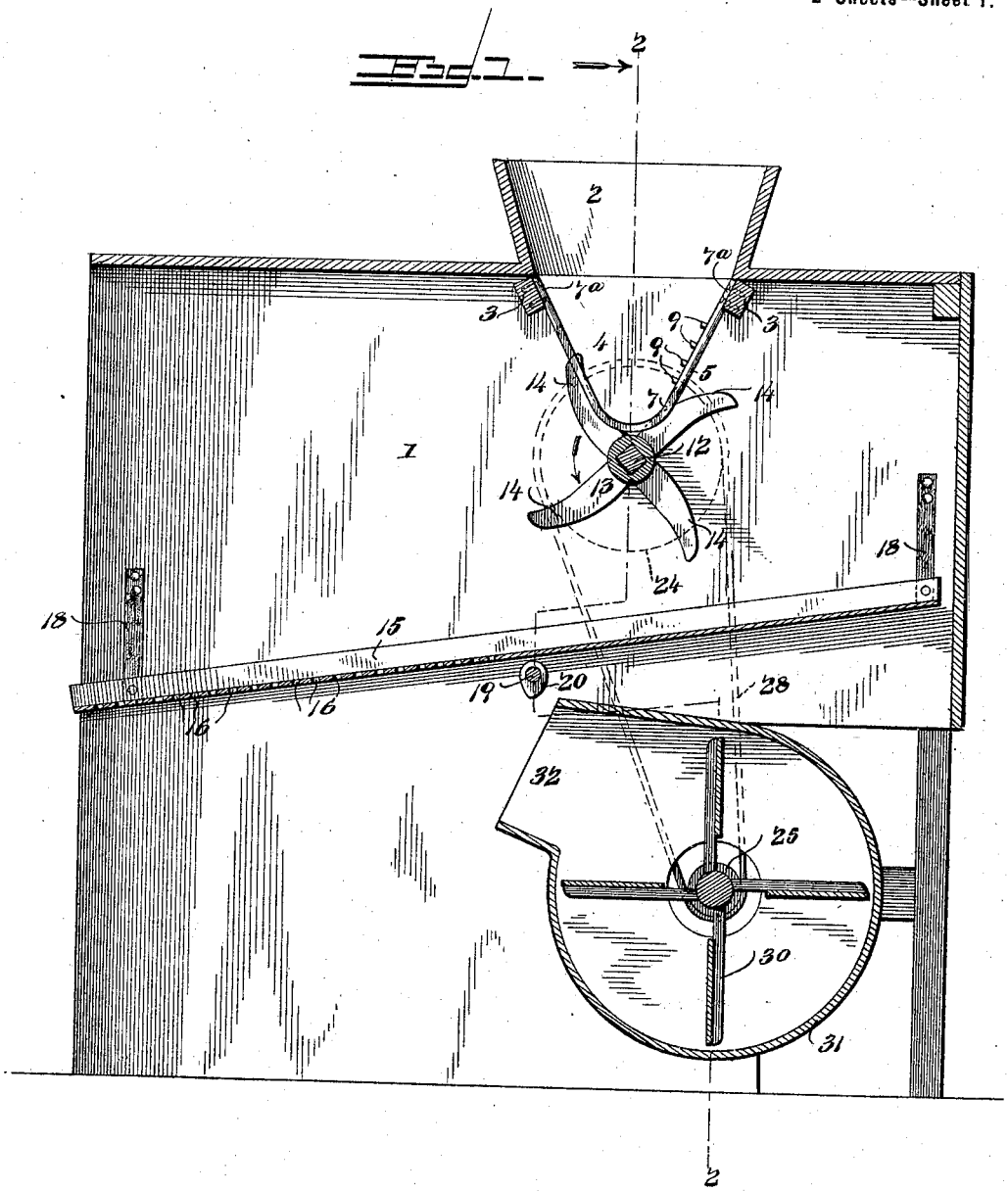

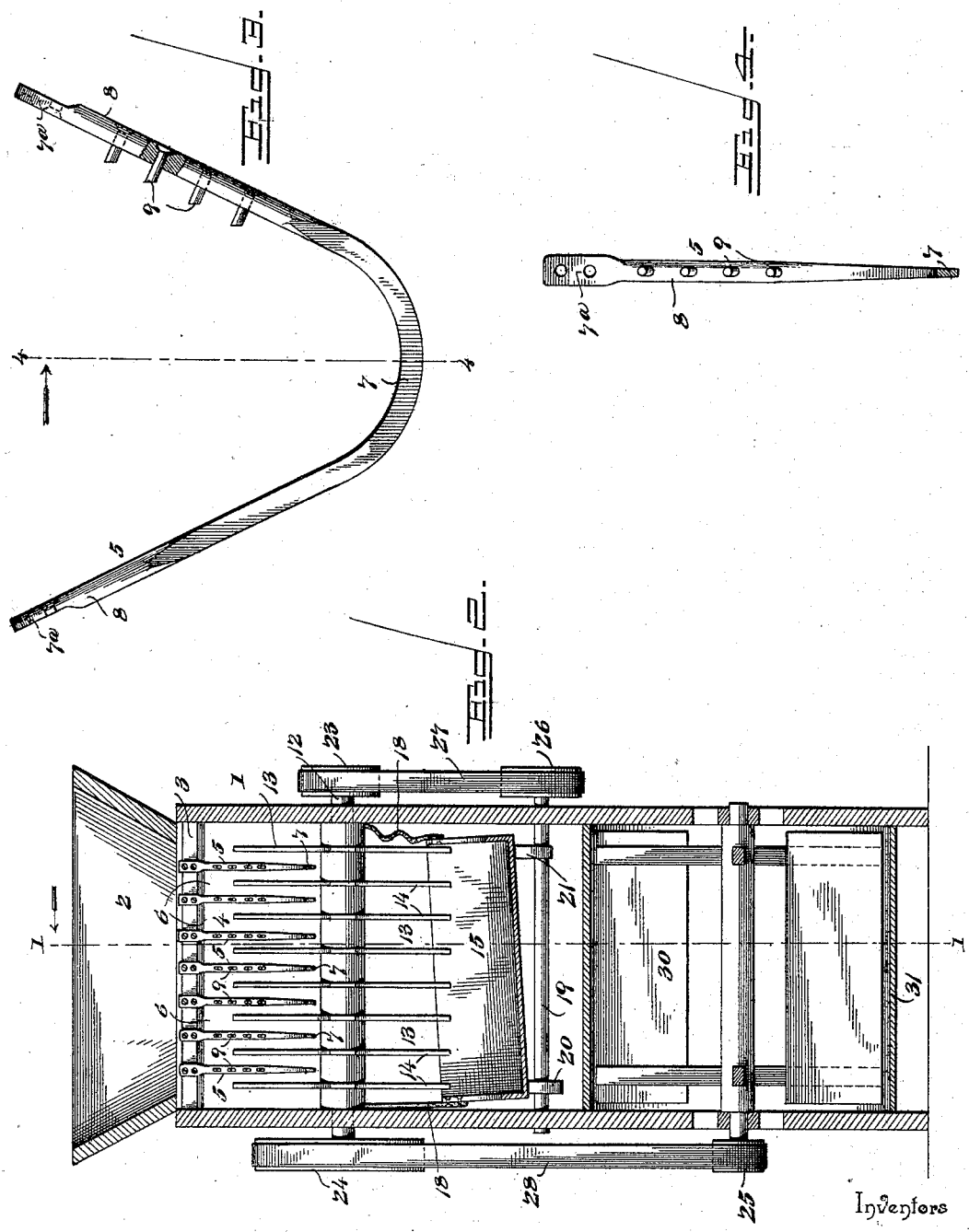

JOHN G. MAHON AND CHARLES E. GOWER, OF BALDWYN, MISSISSIPPI.

PEA OR BEAN THRESHER.

SPECIFICATION forming part of Letters Patent No. 625,846, dated May 30, 1899.

Application filed December 17, 1897. Serial No. 662,311. (No model.)

*To all whom it may concern:*

Be it known that we, JOHN G. MAHON and CHARLES E. GOWER, citizens of the United States, residing at Baldwyn, in the county of Lee and State of Mississippi, have invented a new and useful Pea or Bean Thresher, of which the following is a specification.

Our invention relates to improvements in machines for threshing and separating peas and beans; and the object that we have in view is to provide an improved mechanism for feeding and holding the pods in the path of a rotary cutter, which feed mechanism is constructed to provide for the ready passage of the blades of the cutter, allow the peas or beans and the cut pods thereof to readily pass through, and to restrain the pods from working toward the middle of the basket or crate in a manner to choke or clog the same.

A further object that we have in view is to provide an improved mechanism for giving a lateral and vertical shaking motion to a shoe or screen to effect the separation of the peas or beans from the cut pods and to discharge the refuse separately from the peas or beans.

With these ends in view our invention consists in the novel combination of elements and in the construction and arrangement of parts which will be hereinafter fully described and claimed.

To enable others to understand our invention we have illustrated the preferred embodiment thereof in the accompanying drawings, forming a part of this specification, and in which—

Figure 1 is a vertical sectional elevation taken longitudinally through the machine on the plane indicated by the dotted line 1 1 of Fig. 2. Fig. 2 is a vertical transverse sectional view through the machine on the irregular plane indicated by the dotted line 2 2 of Fig. 1. Fig. 3 is an enlarged detail view, in side elevation, of one of the U-shaped bars, a series of which are employed to form the basket or crate below the hopper of the machine. Fig. 4 is a cross-sectional view taken vertically through the U-shaped bar shown by Fig. 3, the plane of the section being indicated by the dotted line 4 4 of Fig. 3, looking in the direction indicated by the arrow.

Like numerals of reference denote like and corresponding parts in each of the figures of the drawings.

1 designates the casing or frame, and 2 is the feed-hopper, of our improved machine for threshing peas and beans; but as these parts are or may be of the usual construction ordinary in the art we have not deemed it necessary to enlarge upon the detailed construction of said frame and the hopper. Below the breast of the hopper and within the casing or frame 1 are the transverse rails or cleats 3, which are disposed on opposite sides of the opening in the hopper and which serve the purpose of supports for the basket or crate forming in part the subject-matter of our present improvement. This basket or crate is indicated in its entirety by the numeral 4 in the drawings; and it consists of a series of U-shaped bars 5, spaced apart at suitable intervals from each other throughout the length of the hopper and arranged across the vertical plane of the opening in said hopper to intercept the pods of the peas and beans as they are deposited in the feed-hopper to be fed to the machine. These series of U-shaped bars 5 are arranged parallel to each other and are spaced apart for suitable distances, so as to form the series of intervening spaces 6 between said bars, which spaces are utilized for the accommodation of the blades of the revolving cutter hereinafter more fully described.

In Figs. 3 and 4 of the drawings we have illustrated the detailed construction of one of the bars forming the basket or crate, and by reference to said figures it will be seen that each bar is in a single piece of metal bent into approximately U-shaped form. The lower looped part of each U-shaped bar is flattened transversely, substantially as indicated at 7 in Fig. 4 and as shown also in the elevation, Fig. 3; but the flattened part of the bar is not of uniform length on both legs or sides of the bar. Thus, for example, the flattened part of the left-hand leg of the bar is much longer than the flattened part on the right-hand leg of said bar. Above the flattened parts of the legs the U-shaped bars are rounded, as at 8, up to the points where said bars are to be joined to the cleats or rails 3, and at these points the legs of the bars are flattened again, as at 7ª, and perforated to enable them to be snugly applied to the opposing faces of the rails 3 and to be fastened thereto securely by suitable screws or bolts, substantially as shown by Figs. 1 and 2. Each bar has its legs tapered from its flattened upper portion to the lower looped end thereof, and the series of bars are united to the hopper, so as to have the bars lie in parallel relation to each other. This arrangement of the bars and the taper of the legs provides spaces which gradually widen from the upper side portions of the crate to the bottom thereof, and these spaces are continuous or uninterrupted throughout the bottom and sides of the crate to permit of the free passage of the cut or mutilated pods and to prevent the pods from lodging on the bottom of the crate in the intervals between the knives or cutters. The slots at the bottom of the crate are continuous with the slots at the two sides thereof, and the cutter-shaft lies below the crate and is supported independently of the crate and the bottom of the latter, thus obviating the liability of the pods lodging on the shaft to obstruct the slots in the bottom of the crate and providing for the free escape of the pods through such slots.

While we have illustrated and described the bars as having the peculiar flattened ends to be fastened to the rails at the breast of the feed-hopper and while said bars are shown as being separate and independent from each other to enable them to be secured individually to said rails, we do not limit ourselves to the construction of the bars in separate independent pieces, because we are aware that the bars may be joined together or that they may constitute a single casting which as an entirety may be fitted in the machine frame or casing in proper relation to the feed-hopper and be secured to the rails or their mechanical equivalents. We do not, therefore, desire to limit ourselves strictly to the exact construction and arrangement of parts forming the improved crate or basket as herein shown and described.

On that side (the right hand) adjacent to the front or head end of the machine we provide the bars of the crate or basket with a plurality of series of detaining fingers, teeth, or projections 9. In Figs. 3 and 4 of the drawings we have illustrated the individual bars with a series of four of these teeth, which, as shown, are made separate from the right-hand leg of the bar and are inserted through suitable openings therein to have their outer ends headed against the bar, while their inner ends project beyond the inner edge of the bar, so as to extend into the space between the two legs of said U-shaped bar. It is evident, however, that these teeth or fingers may be cast as an integral part of the bar instead of being made separate therefrom and united thereto in the manner described.

The flattened looped ends 7 of the series of bars forming the crate is an important feature in our improvement, because such construction provides ample clearance for the blades of the revolving cutter and enables the peas or beans when separated from their pods to readily fall through the basket or crate and into the shaking-shoe, and the detaining fingers or teeth 9 on the front side of the basket or crate is another important feature of our construction in that said detaining-fingers prevent the peas or pods from working too freely toward the vertical center of the basket or crate, thus overcoming any tendency of the pods to become packed in the basket or crate sufficiently tight to prevent free passage of the revolving cutters through the mass of pods and the crate.

Immediately below the looped ends of the series of bars forming the basket or crate is arranged a transverse cutter-shaft 12, which is journaled in suitable bearings provided on the machine frame or casing, and this shaft carries a plurality of cutters 13, each of which is stamped from a single piece of metal to provide a central hub and a series (two or more) of blades 14. The cutters are fastened through the medium of their hubs on the cutter-shaft in parallel relation to each other and at suitable intervals apart to pass through the spaces 6 between the bars forming the crate or basket, and each cutter has its blades provided with the segmental cutting edges shown by Fig. 1 to enable the same to pass freely through the mass of pods in said crate or basket for the purpose of cutting the pods and liberating the peas or beans therefrom.

The shaking-shoe 15 of our machine is arranged in an inclined position from front to rear within the machine frame or casing and immediately below the revolving cutter, the basket or crate, and the hopper. This shoe has its upper head portion imperforate for a part of of its length, while the lower half of the shoe is perforated, as at 16, with a plurality of apertures of suitable size to constitute a screen and permit the peas or beans to pass therethrough.

We prefer to construct the shoe in the form of a metallic tray having upturned flanges at the side edges thereof, and said tray is suspended within the machine-casing from the suspending-straps 18, attached, respectively, to the flanged tray and to the casing, said straps serving to permit the tray to have a limited vertical, as well as a lateral, shaking motion. The tray-shaped shoe is vibrated vertically and laterally by the action of the cams 20 21 on a single cam-shaft 19, which is arranged transversely across the machine below said shoe and is journaled in suitable bearings in the machine casing or frame. The cam 20 is arranged to project from one side of the shaft near one end thereof, while the other cam 21 projects from the opposite side of said shaft near its opposite end. These cams are disposed to have contact with the shoe near its opposite side edges, and the cams are brought alternately into service during each revolution of the shaft 19. The described construction of the cams on the cam-shaft serves to give to the shoe, which is suspended by the flexible straps, a vibrating motion in a vertical and transverse direction within the machine-casing, and as said shoe is suspended by the straps in a vertically-inclined position longitudinally with respect to the machine it will be seen that the contents of the shoe will be agitated violently to insure the proper feed of the peas or beans and their macerated pods through said shoe toward its delivery end in a manner to cause the peas or beans to pass through the apertures 16 in the shoe, while the macerated pods are discharged over the tail end of said shoe.

While the peas and their pods are contained on the shoe they are subjected to a blast of air forced by a rotary blower or fan 30, which is contained within a suitable fan-casing 31, having its delivery-mouth 32 arranged to direct the blast of air upwardly against the shoe.

The fan-shaft, the cam-shaft, and the cutter-shaft have their ends extended beyond their bearings in the machine-casing, and on the extended ends of the cutter-shaft 12 are secured the belt-pulleys 23 24. A single belt-pulley 25 is secured on one end of the fan-shaft, and a like belt-pulley 26 is secured on one end of the cam-shaft. The cam-shaft is driven from the belt-pulley 23 of the cutter-shaft through the medium of an endless belt 27, while the fan-shaft is driven in like manner from the pulley 24 of the cutter-shaft through the medium of the belt 28, whereby all of the parts are operatively connected together to operate in synchronism.

This being the construction of our improved machine, the operation may be described briefly as follows: The peas or beans in their pods are fed indiscriminately through the feed-hopper into the basket or crate, and motion being communicated to the cutter-shaft from any suitable source of power the cutters are caused to revolve in the spaces 6, between the series of bars forming the basket or crate 4. The pods are macerated and cut by the action thereon of the revolving knives of the cutter-shaft, and the peas or beans are thus liberated from their pods. The macerated pods and beans or peas liberated therefrom pass from the basket or crate upon the vibrating shoe 15, and they are subjected to the agitation of this shoe and to the action of the current or blast of air from the fan. The macerated pods are discharged over the tail end of the shoe, while the peas or beans pass through the perforations therein into the receptacle placed below the shoe.

It is evident that changes in the form and proportion of parts and in the details of construction may be made without departing from the spirit or sacrificing the advantages of the invention.

Having thus described the invention, what we claim as new, and desire to secure by Letters Patent, is—

1. In a machine for threshing peas and beans, a crate or basket comprising a series of U-shaped bars each of which has its legs or members round in cross-section for a part of their length and with the looped or bowed lower end of said bar flattened and of less cross-sectional area than the rounded part of the bar, in combination with a hopper to feed to the crate or basket, a cutter-shaft below the crate, and a series of rotary cutters carried by the shaft and working in the intervals between the U-shaped bars, whereby the upper rounded and enlarged parts of the bars sustain the contents of the crate against escape therefrom while the thin flattened lower parts of the bars provide enlarged spaces for the escape of the mutilated pods and the free rotation of the blades therein, substantially as described.

2. In a machine for threshing peas and beans, a crate or basket comprising a plurality of U-shaped bars, each of which has its members tapered from the upper extremities of its legs or members toward the lower looped end thereof and said bars arranged in parallel relation to each other to form a series of slots or spaces which are wider at the bottom of the crate than at the upper part thereof, and a series of detaining-fingers on one member or leg of each U-shaped bar and projecting inwardly therefrom into the space of the crate, combined with a hopper which feeds to the crate, a rotary cutter-shaft below the crate, and a series of cutters carried by the cutter-shaft and working in the intervals between the bars, substantially as described.

In testimony that we claim the foregoing as our own we have hereto affixed our signatures in the presence of two witnesses.

JOHN G. MAHON.
CHARLES E. GOWER.

Witnesses:
J. E. ABRAMS,
EARL NORMAN.